(12) United States Patent
Saint-Lary et al.

(10) Patent No.: US 11,092,263 B2
(45) Date of Patent: Aug. 17, 2021

(54) FLUID CIRCULATION PIPE FOR MOTOR VEHICLE, METHOD FOR MANUFACTURING SAME AND USE THEREOF AS MOTOR VEHICLE ENGINE COOLANT HOSE

(71) Applicant: TRISTONE FLOWTECH SOLUTIONS (TFS), Carquefou (FR)

(72) Inventors: Dominique Saint-Lary, Nantes (FR); Francois Le Briquer, Nantes (FR)

(73) Assignee: TRISTONE FLOWTECH SOLUTIONS (TFS), Carquefou (FR)

( * ) Notice: Subject to any disclaimer, the term of this patent is extended or adjusted under 35 U.S.C. 154(b) by 109 days.

(21) Appl. No.: 16/480,099

(22) PCT Filed: Feb. 1, 2018

(86) PCT No.: PCT/FR2018/050242
§ 371 (c)(1),
(2) Date: Jul. 23, 2019

(87) PCT Pub. No.: WO2018/142079
PCT Pub. Date: Aug. 9, 2018

(65) Prior Publication Data
US 2019/0376629 A1    Dec. 12, 2019

(30) Foreign Application Priority Data
Feb. 2, 2017   (FR) ..................................... 1750869

(51) Int. Cl.
*F16L 11/12*    (2006.01)
*C08L 23/02*    (2006.01)
(Continued)

(52) U.S. Cl.
CPC ............. *F16L 11/12* (2013.01); *C08L 23/025* (2013.01); *C08L 23/06* (2013.01); *C08L 23/12* (2013.01);
(Continued)

(58) Field of Classification Search
CPC . F16L 11/12; C08L 2203/18; C08L 2205/025; C08L 2207/04; C08L 23/025
(Continued)

(56) References Cited

U.S. PATENT DOCUMENTS 6,451,915 B1 *  9/2002  Ellul .................. C08L 23/10
                                                525/191
7,868,096 B2 *  1/2011  Ellul .................. C08L 23/16
                                                525/240
(Continued)

FOREIGN PATENT DOCUMENTS

CN    101260954    9/2008

OTHER PUBLICATIONS

International Search Report dated May 16, 2018.
International Search Report 2 dated Jul. 11, 2018.
CN Office Action dated Jun. 3, 2021.

*Primary Examiner* — Robert B Davis
(74) *Attorney, Agent, or Firm* — Ipsilon USA, LLP

(57) ABSTRACT

A motor vehicle cooling fluid flow pipe, such as an engine cooling fluid pipe, characterized in that the wall of the pipe is constituted by a single layer made of a polymer material comprising a mixture of at least two polymer materials of different natures, one of which, referred to as a first material, being a polyolefin, and the other of which, referred to as a second material, being a thermoplastic polymer elastomer (TPE).
The method of manufacturing this pipe comprises an operation of mixing at least the polyolefin and the thermoplastic polymer elastomer (TPE), a step of extruding said mixture
(Continued)

in a screw extruder followed by a step of forming the pipe, the operation of mixing the polyolefin and the thermoplastic polymer elastomer (TPE) being performed upstream from the extruder or at its inlet.

12 Claims, 1 Drawing Sheet

(51) Int. Cl.
*C08L 23/06* (2006.01)
*C08L 23/12* (2006.01)

(52) U.S. Cl.
CPC ..... *C08L 2203/18* (2013.01); *C08L 2205/025* (2013.01); *C08L 2207/04* (2013.01); *C08L 2207/062* (2013.01)

(58) Field of Classification Search
USPC ........................................ 428/36.92
See application file for complete search history.

(56) References Cited

U.S. PATENT DOCUMENTS

| | | | |
|---|---|---|---|
| 8,709,316 B2* | 4/2014 | Walia | B01F 15/0234 |
| | | | 264/211.21 |
| 2004/0171758 A1* | 9/2004 | Ellul | C08L 23/16 |
| | | | 525/192 |
| 2009/0186217 A1* | 7/2009 | Brzoskowski | B32B 27/18 |
| | | | 428/339 |
| 2010/0055367 A1 | 3/2010 | Ohigawa | |
| 2010/0113694 A1* | 5/2010 | Nadella | C08L 23/10 |
| | | | 525/53 |
| 2010/0227099 A1* | 9/2010 | Van Hooren | F02M 37/0017 |
| | | | 428/36.92 |

* cited by examiner

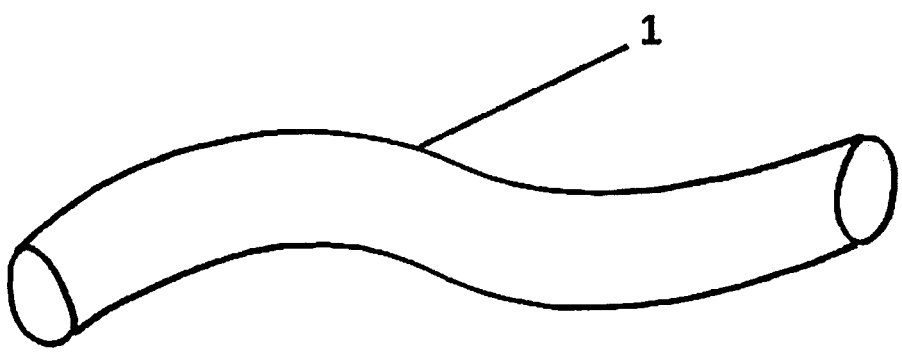

FLUID CIRCULATION PIPE FOR MOTOR VEHICLE, METHOD FOR MANUFACTURING SAME AND USE THEREOF AS MOTOR VEHICLE ENGINE COOLANT HOSE

RELATED APPLICATION

This application is a National Phase of PCT/FR2018/050242 filed on Feb. 1, 2018, which claims the benefit of priority from French Patent Application No. 17 50869, filed on Feb. 2, 2017, the entirety of which are incorporated by reference.

FIELD OF THE INVENTION

The present invention relates to the field of fluid flow pipes. More particularly, the invention relates to fluid flow pipes for motor vehicles, such as an engine cooling fluid pipe, and also to a method of manufacturing such a pipe.

PRIOR ART

Fluid flow pipes, such as the pipes used in the automobile industry, are used in particular for conveying a cooling fluid, such as a mixture of water and ethylene glycol, in the cooling circuit of the engine. The main constraints on such pipes lies with withstanding high temperatures and pressure while the engine is in operation, and their ability to withstand attack from the liquid being transported. In particular, the use of polyurethane is avoided since it is incompatible with contact with fluids that contain a glycol.

At present, these fluid flow pipes, such as pipes for engine cooling liquid, are generally made as one or more layers of polymer elastomer material (such as rubber) reinforced by a knit or a braid of textile material or of aramid or polyester fibers. By way of example, and as described in Document GB 1 522 236, two polymer layers are extruded one around the other, the reinforcing material being interposed between those two layers. The inner layer is made of polyethylene, preferably silane-grafted high density polyethylene, and the outer layer is made of polypropylene.

The main drawbacks of those types of pipe incorporating at least one reinforcing layer are associated with their weight and their bulk (in particular because of their thickness). Their manufacturing cycle, which is in part manual, is of a duration that is too long. In addition, because of their stiffness, said pipes transmit forces to interfaces, in particular under the effect of the engine vibrating.

Since the space under the hood is becoming smaller and smaller and the present trend is to make vehicles generally lighter, Document FR 2 797 673 proposes, in order to reduce weight, and thus the bulk of such pipes, a pipe for a cooling circuit, in particular for a fuel-burning engine, that is made up of at least three distinct layers. Going from the inside towards the outside, those layers are constituted by an inner layer made of cured polyethylene, an intermediate layer made of polypropylene, and an outer layer made of a polyolefin-based thermoplastic elastomer material, e.g. an EPDM/polypropylene elastomer alloy. The polyethylene of the inner layer may for example be cured using silanes.

Such a multilayer structure, involving numerous different polymer materials, is still much too complex to give rise to manufacture that is economically advantageous. In addition, such multilayer structures have materials that are difficult to separate for recycling purposes.

OBJECTS OF THE INVENTION

A first object of the invention is thus to mitigate the above-described drawbacks and to propose a fluid flow pipe having wall thickness that is still small, while maintaining the necessary strength for it to be used in particular as a motor vehicle engine cooling fluid pipe.

Another object of the invention is to reduce the weight of cooling pipes in order to further lighten vehicles.

Another object of the invention is to propose a fluid flow pipe having a smaller number of polymer materials, in order to make its manufacture simpler and thus quicker and less expensive.

Another object of the invention is to propose a fluid flow pipe that can be recycled easily.

BRIEF DESCRIPTION OF THE DRAWINGS:

The sole FIGURE shows a motor vehicle cooling pipe in accordance with one embodiment.

DESCRIPTION OF THE INVENTION

To this end, the present invention provides a motor vehicle cooling fluid flow pipe, such as an engine cooling fluid pipe, characterized in that the wall of the pipe is constituted by a single layer made of a polymer material comprising a mixture of at least two polymer materials of different natures, one of which, referred to as a first material, being a polyolefin, and the other of which, referred to as a second material, being a thermoplastic polymer elastomer (TPE). Advantageously, the wall of the pipe is constituted by a single layer made of a polymer material constituted exclusively of the mixture of said first material and of said second material.

The term "pipe" is used below throughout the present text to designate any tube, tubing, hose, piping, and thus in particular engine cooling fluid pipes.

Surprisingly, the inventors have been able to make a pipe having a single-layer wall that satisfies the criteria set out in the introduction by means of a mixture of polyolefin and of a thermoplastic polymer elastomer, whereas those two types of polymer are used in Document FR 2 797 673 to form outer layers of engine cooling fluid pipes, in association with other inner and/or intermediate layers. In that document, the layer made of polyolefin and of a thermoplastic polymer elastomer therefore does not come into contact with the glycol-based cooling fluid.

Such a pipe having a single-layer wall is much easier to manufacture than are pipes having a multi-layer wall.

Furthermore, the thickness of the single-layer wall is small, thereby making it easier to install the pipe in restricted spaces, such as battery packs or the engine compartments of present-day motor vehicles.

In addition, such a pipe with a single-layer wall is easier to recycle.

Advantageously, the polymer material of said pipe has a polyolefin content of at least 30% by weight, preferably at least 40% by weight.

More particularly, the polymer material may have a polyolefin content lying in the range 30% to 70% by weight, preferably in the range 40% to 60% by weight. The proportions by weight within those ranges are selected in particular as a function of the mechanical strength desired for the pipe and its purpose.

Outside those ranges, the properties of the pipe may be degraded: with less than 30% by weight, the performance, in particular in terms of the ability to withstand pressure, is degraded, and above 70% by weight, the material becomes too stiff, and thus more difficult to install in a vehicle, and the pipe transmits too much force to its interfaces.

The thermoplastic polymer elastomer, which serves in particular to impart a degree of flexibility to said pipe, is preferably a polyolefin-based polymer elastomer, e.g. a vulcanized elastomer.

Said polyolefin-based thermoplastic polymer elastomer advantageously presents hardness on the Shore A scale lying in the range 30 to 70, preferably in the range 35 to 65, more preferably in the range 40 to 65.

Said first material is a polyolefin selected from polypropylene (PP), polyethylene (PE), preferably high density polyethylene (HDPE), a cross-linked polyethylene (PEX), or a mixture thereof.

The present invention also provides a method of manufacturing a fluid flow pipe as described above. The method comprises an operation of mixing at least the polyolefin and the thermoplastic polymer elastomer (TPE), a step of extruding said mixture in a screw extruder followed by a step of forming the pipe, the operation of mixing the polyolefin and the thermoplastic polymer elastomer being performed upstream from the extruder or at its inlet.

This is indeed a step of extruding the mixture of the two polymers, polyolefin and thermoplastic polymer elastomer, leading to a single-layer structure, and this is not co-extrusion of two polymers leading to a two-layer structure.

The installation for performing this method thus comprises a feed hopper for each of the polymers, with a mixing zone upstream from the screw extruder or its inlet, or else a single feed hopper receiving the two polymers in the desired proportions (in the form of a premix).

Said mixture comprising the polyolefin and the thermoplastic polymer elastomer is advantageously extruded at a temperature lying in the range 180° C. to 240° C., and preferably in the range 200° C. to 220° C. Such a temperature enables the two different materials to be made thoroughly homogenous in the cylinder of the extruder during the extrusion step.

The forming is performed in a heating enclosure.

The present invention also provides the use of said fluid flow pipe as described above, as a cooling fluid pipe, such as for a fuel-burning engine, an electric motor, an electrical converter, or a vehicle battery.

Other features and advantages appear from the following description of a non-limiting embodiment of the invention.

EMBODIMENT OF METHOD OF MANUFACTURE

An embodiment of a method of manufacture of a cooling fluid pipe for cooling an engine comprises:
  mixing, in proportions by weight 40/60, polypropylene (PP) and a vulcanized polyolefin-based thermoplastic polymer elastomer (thermoplastic vulcanizate (TPV)), e.g. having the trademark Santoprene® (marketed by the supplier ExxonMobile);
  using a screw to introduce said polymer mixture into an extruder;
  extruding said polymer mixture at a temperature lying in the range 200° C. to 220° C., leading to a tubular shape;
  thermoforming the extruded material in a hot air oven to give it its final shape, i.e. a tubular pipe 1 as shown in the sole FIGURE; then
  cooling; and
  optionally assembling connector elements.

The tubular pipe 1 presents a single layer wall of thickness that may lie in the range 2 millimeters (mm) to 4 mm. This small thickness and its specific gravity close to 0.95 makes it possible, for equivalent mechanical properties, to reduce the weight of the pipe by about 40% compared with a pipe having the same mechanical performance and made of vulcanized rubber (having specific gravity that generally lies in the range 1.15 to 1.20) together with textile reinforcement, and having a thickness in the range 3 mm to 5 mm.

The pipe 1 of the invention can withstand temperatures in the range −40° C. to 125° C., and simultaneously it can withstand pressures of about 1 bar to 4 bars relative.

The presence of the thermoplastic polymer elastomer in the polymer material forming the wall of the pipe presents several advantages, including:
  damping vibration, while the engine is in operation and the vehicle is running; and
  greater flexibility: thus enabling ends of said pipe 1 to be fastened to connector endpieces, regardless of whether they are smooth or serrated, without requiring the use of an assembly system such as clamping collars. This simplifies assembly of the cooling pipe and makes assembly quicker, both during initial assembly and during replacement, if any.

Furthermore, the single layer wall made of polypropylene (PP) and of vulcanized polyolefin-based thermoplastic polymer elastomer (TPV) is suitable for withstanding chemical attacks from the cooling fluid being transported, in particular when it contains glycol, and for withstanding high pressures and temperatures, in particular while the engine is in operation.

The invention claimed is:

1. A motor vehicle cooling fluid flow pipe, wherein the wall of the pipe is constituted by a single layer made of a polymer material comprising a mixture of at least two polymer materials of different natures, one of which, referred to as a first material, being a polyolefin, and the other of which, referred to as a second material, being a vulcanized polyolefin-based thermoplastic polymer elastomer (TPV), and in that the polymer material has a polyolefin content lying in the range 30% to 70% by weight.

2. The motor vehicle cooling fluid flow pipe according to claim 1, wherein the polymer material has a polyolefin content lying in the range 40% to 60% by weight.

3. The motor vehicle cooling fluid flow pipe according to claim 1, wherein the vulcanized polyolefin-based thermoplastic polymer elastomer (TPV) presents hardness on the Shore A scale lying in the range 30 to 70.

4. The motor vehicle cooling fluid flow pipe according to claim 1, wherein the vulcanized polyolefin-based thermoplastic polymer elastomer (TPV) presents hardness on the Shore A scale lying in the range 35 to 65.

5. The motor vehicle cooling fluid flow pipe according to claim 1, wherein the vulcanized polyolefin-based thermoplastic polymer elastomer (TPV) presents hardness on the Shore A scale lying in the range 40 to 65.

6. The motor vehicle cooling fluid flow pipe according to claim 1, wherein said first material is a polyolefin selected from polypropylene (PP), polyethylene (PE), high density polyethylene (HDPE), a cross-linked polyethylene (PEX), or a mixture thereof.

7. A method of manufacturing the motor vehicle cooling fluid flow pipe according to claim 1, comprising the steps of:
  an operation of mixing at least the polyolefin and the vulcanized polyolefin-based thermoplastic polymer elastomer (TPV), a step of extruding said mixture in a screw extruder followed by a step of forming the pipe, the operation of mixing the polyolefin and the vulcanized polyolefin-based thermoplastic polymer elastomer (TPV) being performed upstream from the extruder or at its inlet.

8. The method according to claim 7, wherein said mixture comprising the polyolefin and the vulcanized polyolefin-based thermoplastic polymer elastomer (TPV) is extruded at a temperature lying in the range 180° C. to 240° C.

9. The method according to claim 7, wherein said mixture comprising the polyolefin and the vulcanized polyolefin-based thermoplastic polymer elastomer (TPV) is extruded at a temperature lying in the range 200° C. to 220° C.

10. A cooling fluid pipe for a fuel-burning engine, an electric motor, an electrical converter, or a vehicle battery, wherein said cooling fluid pipe includes a fluid flow pipe according to claim 1.

11. The motor vehicle cooling fluid flow pipe according to claim 1, wherein said pipe is an engine cooling fluid pipe.

12. The motor vehicle cooling fluid flow pipe according to claim 6, wherein the polyolefin is a high density polyethylene (HDPE).

* * * * *